United States Patent [19]
Seaberg

[11] 3,898,811
[45] Aug. 12, 1975

[54] CONTROL LINKAGE FOR DUAL PATH HYDRAULIC DRIVE

[75] Inventor: David H. Seaberg, Davenport, Iowa

[73] Assignee: J. I. Case Company, Racine, Wis.

[22] Filed: June 20, 1974

[21] Appl. No.: 481,027

[52] U.S. Cl. .................. 60/421; 60/428; 60/431; 180/6.48
[51] Int. Cl.² ............................ F15B 13/09
[58] Field of Search ............ 60/327, 420, 421, 423, 60/428, 429, 431, 486, 389; 180/6.3, 6.32, 6.34, 6.48

[56] References Cited
UNITED STATES PATENTS

| | | | |
|---|---|---|---|
| 3,161,245 | 12/1964 | Thoma | 180/6.48 |
| 3,500,633 | 3/1970 | Livezey | 60/389 |
| 3,504,493 | 4/1970 | Potter et al. | 180/6.48 X |

*Primary Examiner*—Edgar W. Geoghegan
*Attorney, Agent, or Firm*—Cullen, Settle, Sloman & Cantor

[57] ABSTRACT

A conventional engine and dual hydraulic pumps for a prime mover, such as a crawler tractor or the like, include a novel control linkage assembly for proportionally reducing the output of both hydraulic pumps when the engine encounters an overload condition. The control linkage assembly includes a pair of linkage members operatively connected at one of their ends to the output control of a respective hydraulic pump and slideably received at their other ends within a compensator rocker cam. Each link of the pair of linkage members is respectively interconnected with an operator control lever such that the cam ends of the linkage members are positioned within the compensator rocker cam in accordance with the operative position of the control levers. The rocker cam is pivotally mounted on the prime mover; an actuator pivots the rocker cam when the engine experiences an overload to thereby proportionally reduce the output of each hydraulic pump on the basis of the position of the linkage members within the rocker cam.

20 Claims, 5 Drawing Figures

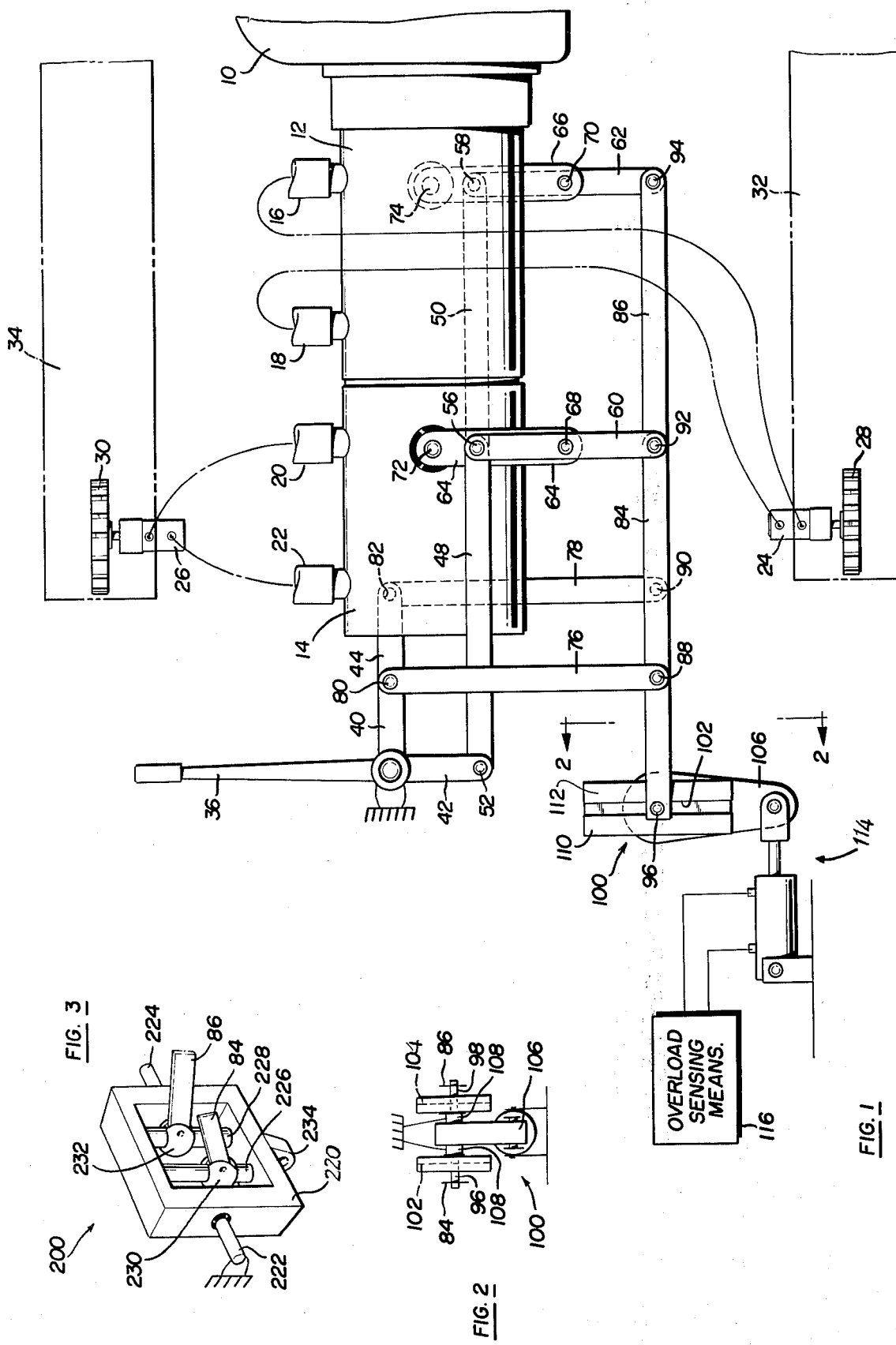

CONTROL LINKAGE FOR DUAL PATH HYDRAULIC DRIVE

BACKGROUND OF THE INVENTION

1. Field of the Invention

The present invention relates to a dual hydraulic power system for driving the opposed output shafts of a prime mover, and more particularly to a compensator control system for proportionally reducing the output of each of the hydraulic pumps during an overload condition.

2. The Prior Art

Prime movers such as crawler tractors and "skid-steer" tractors are frequently subjected to overload conditions during an earth working operation. If these implements are not governed in some manner the engine will simply stall during an overload condition, resulting not only in power loss to the driving components for the prime mover but also to other implements. The prior art has suggested overload sensing means which reduces the power output of the hydraulic transmission or hydraulic pump on the prime mover which is experiencing an overload condition. If there are two separate hydraulic transmissions or pumps for independently and separately driving output components for the prime mover, as is most commonly the case, and if the power output is reduced for only the pump experiencing an overload, the prime mover will deviate from the steered course selected by the operator control levers on the operator control console.

Prior art patents, for example U.S. Pat. Nos. 3,161,245 to Thoma and 3,500,633 to Livezey, have proposed an overload sensing mechanism for proportionally reducing the power output from each of the hydraulic transmissions in order to maintain the prime mover in its steered course. These patents, however, disclose interconnecting the two operator control levers by a linkage system which requires linkage members for manipulating the control output shafts of the separate hydraulic transmissions, thereby resulting in a proliferation of linkage components to increase the initial cost of the linkage assembly and to increase the likelihood of a mechanical malfunction.

The present invention overcomes these prior art problems and shortcomings by interconnecting the operator control system to a control output shaft on each of the hydraulic pumps. The specific disclosure of the preferred embodiment disclosed herein includes a separate operator control lever for each hydraulic pump; however, a mechanical linkage may be employed so that only a single operator control lever would be required. The particular arrangement proposed by the presently disclosed preferred embodiment results in a simplicity of design, a reduction in elements and cost, and greater accuracy in controlling the individual speeds of the hydraulic pumps and the proportional reduction in speeds upon encountering an overload.

SUMMARY OF THE INVENTION

The present invention, in the preferred embodiment, includes a pair of independent operator control levers for a prime mover, such as a crawler tractor or skid-steer tractor, for individually controlling the power output from one of a pair of hydraulic swash-plate type pumps. In order to steer this type of prime mover the control levers are positioned at different relative drive control locations to regulate the output from the hydraulic pumps for driving individual drive components. For example, when it is desired to drive a crawler tractor into a turn, the operator will simply vary the positions of the output control shafts for the two pumps so that one of the crawler track chains rotates at a greater velocity to steer the prime mover in an arcuate path.

When the engine or one of the hydraulic pumps experiences an overload condition, the power output of each of the hydraulic pumps is proportionally reduced by a linkage system which interconnects the pump output control shafts and the operator control levers to a rocker cam assembly pivotally mounted to the prime mover. The rocker cam assembly includes a pair of linear guide surfaces which respectively, slideably receive a pair of follower components which are positioned along the guide surfaces away from the pivot axis of the rocker cam assembly in direct proportion to the position of the output control shafts of the respective hydraulic pumps.

The linkage assembly includes a pair of input transmitting control links interconnecting each of the operator control levers with a respective hydraulic pump output control shaft. Each of the hydraulic pumps has a throttle which includes a control arm having an output rocker link pivotally mounted to the control arm and to one of the input control transmitting links. A pair of guide links respectively interconnect one of the follower components with one of the hydraulic pump throttle components by pivotal connections between the guide link and the output rocker link. A pair of input positioning links respectively interconnect one of the operator control levers with one of the guide links to position the follower components along the guide surfaces of the rocker cam assembly in accordance with the output from the hydraulic pumps.

When either of the operator control levers is in a neutral, (or idling) position, the respective follower component is located at the pivoting axis of the rocker cam assembly. When one of the operator control levers is manipulated by an operator to effect a power output from one of the hydraulic pumps, the corresponding follower component is moved away from the pivot axis of the rocker cam assembly by the interconnection with the input positioning links and the guide link. If the prime mover is being driven in a straight path, the operator control levers will be in similar positions and the follower components will be in the same relative position within their respective guide slots away from the pivot axis of the rocker cam assembly. If the prime mover is negotiating a turn, the operator control levers will be positioned differently and the follower components will also be positioned away from the pivot axis of the rocker cam assembly in direct proportion to the power output of each of the respective hydraulic pumps.

If the engine encounters an overload condition in either of these driving situations, a sensing means actuates a hydraulic ram which pivots the rocker cam assembly and thereby displaces the follower components along an arcuate path in direct proportion to their distance from the rocker cam pivot axis. If the follower components are positioned in the same location away from the pivot axis, the power output from both of the hydraulic pumps is reduced by the same amount.

If the follower components are located at different positions along the respective guide slots in relation to the rocker cam pivot axis when an overload condition occurs, the power output from each of the hydraulic pumps will be proportionally reduced through the guide link and output rocker link connections in direct proportion to the position of the respective follower component away from the rocker cam pivot axis.

As pointed out previously, this particular arrangement involves a minimum of linkage components and results in a highly accurate proportional reduction in output power from the hydraulic pumps.

BRIEF DESCRIPTION OF THE DRAWINGS

FIG. 1 is a schematic side view of the engine, dual hydraulic pumps and control linkage assembly forming the present invention.

FIG. 2 is a sectional view along line 2—2 in FIG. 1, illustrating one preferred embodiment of the compensator cam and rocker assembly.

FIG. 3 is a perspective view of a second preferred embodiment of the compensator cam and rocker assembly.

DETAILED DESCRIPTION OF THE INVENTION

Figure 4:
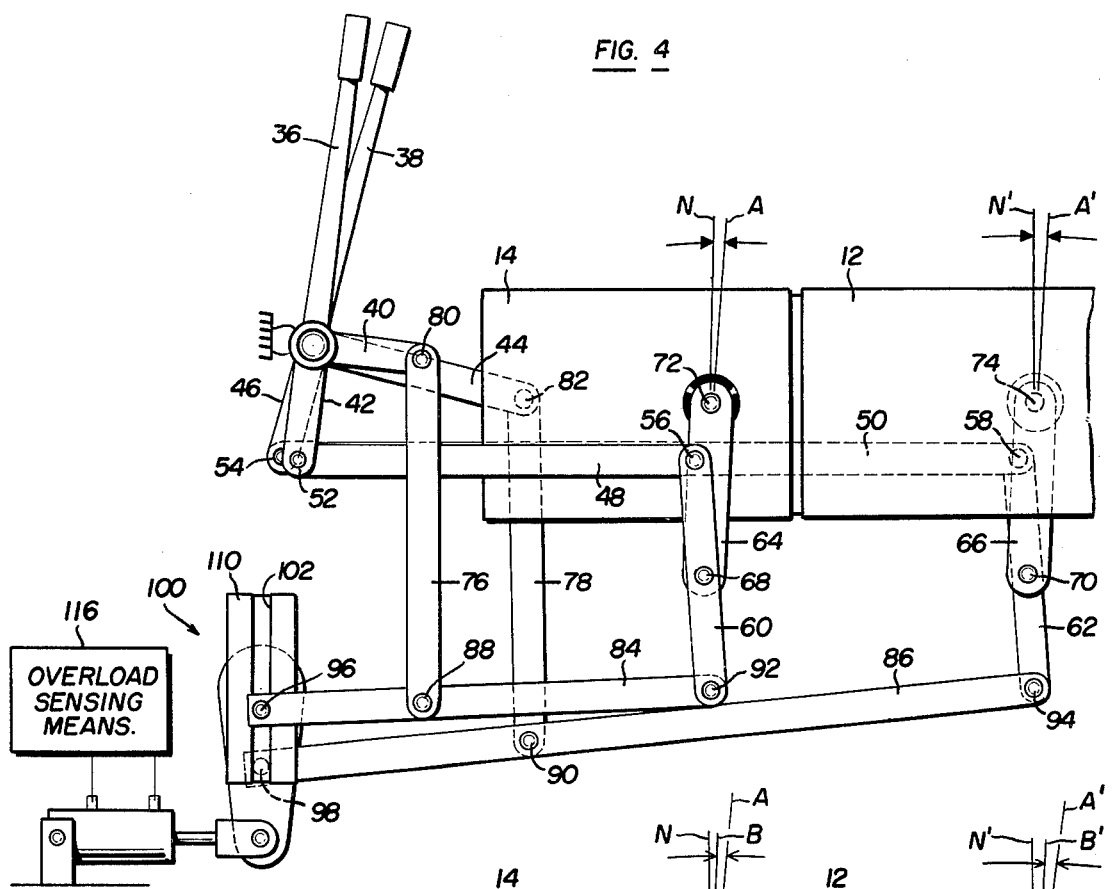
FIG. 4 is a view similar to FIG. 1, illustrating the control levers and linkages in different relative operating positions during a turning operation of the prime mover.

The present invention relates to a power system for a prime mover of the type having a pair of independent output shafts, such as crawler tractors or "skid-steer" tractors. FIG. 1 illustrates the power system proposed by the present invention, as including an engine 10 conventionally connected to a pair of tandem hydraulic swash-plate type pumps 12 and 14 having a variable output. Hydraulic output from the pumps is respectively through a pair of hydraulic conduits 16, 18 and 20, 22 which are connected to conventional motors 24 and 26 for driving the output components of the prime mover, which in the preferred embodiment include drive sprockets 28 and 30 and chain tracks 32 and 34 for a crawler tractor. Although the present invention is described as being utilized in an embodiment for regulating the output from a pair of hydraulic pumps, it is to be understood that this description is not intended to be so limiting. This invention is readily adaptable for regulating the power output from any other hydraulic power source, such as a variable output hydraulic motor.

Figure 5:
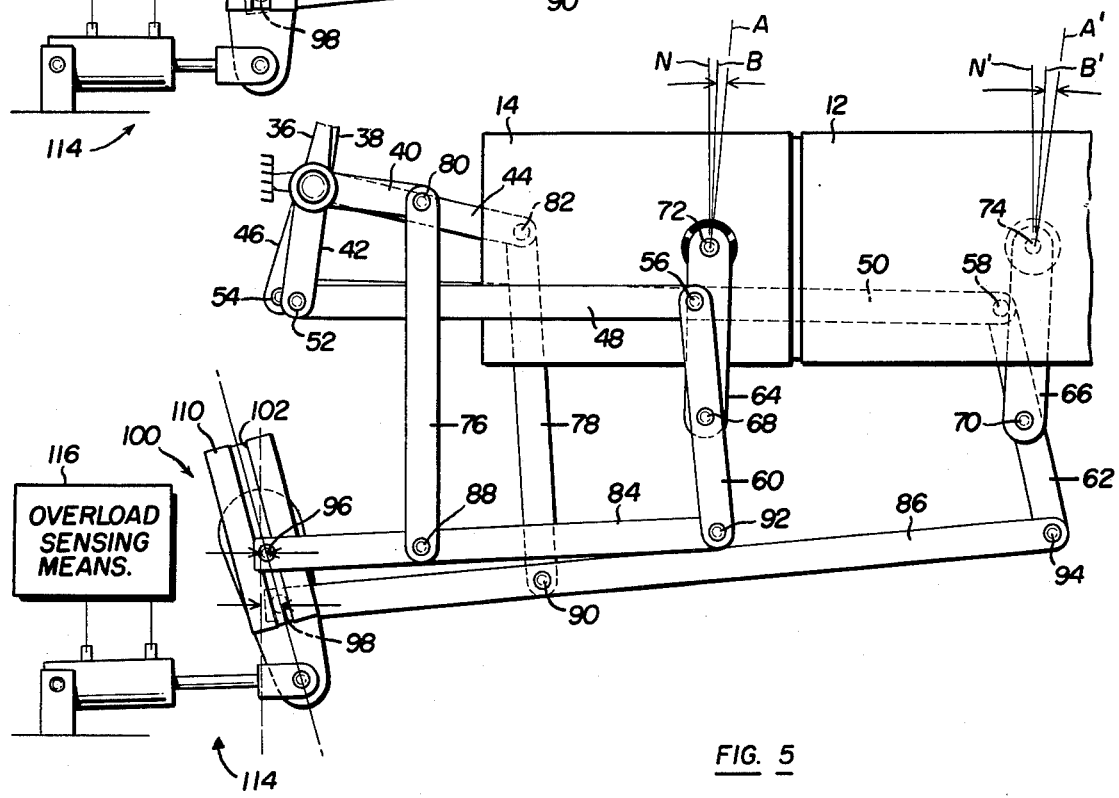
FIG. 5 is a view similar to FIGS. 1 and 4, illustrating the manner of proportionally reducing the power output from each of the hydraulic pumps.

One of the problems encountered in prior art devices having dual output drive components involves the non-proportional reduction of power output to each of the output drive components when one of the hydraulic pumps encounters an overload condition. The present invention overcomes this problem by a power input and steering system having dual operator control levers 36 and 38 pivotally located in a neutral position in FIG. 1. Only the operator control lever 36 can be seen in FIG. 1 since the two levers are identical and are both located in a neutral position in that particular Figure. The operator control levers include bellcranks having arms 40, 42 and 44, 46, respectively, as best illustrated in FIGS. 4 and 5. It is to be understood, however, that the present invention could be employed in an arrangement having a single operator control lever which regulates the output of both hydraulic pumps through a linkage arrangement.

The control linkage mechanism encompassed by the present invention for regulating the output of each pump and for accommodating proportional power reduction upon an overload includes input control transmitting links 48 and 50 pivotally connected to respective bellcrank arms 42 and 46 by pivotal connections 52 and 54. The opposite ends of the input control transmitting links are pivotally connected by connections 56 and 58, respectively, to output rocker links 60 and 62 which are pivotally mounted to pump output control arms 64 and 66 by respective pivotal connections 68 and 70. The pump output control arms are pivotally connected to respective pumps 14 and 12 by output control shafts 72 and 74 for regulating and varying the power output to the driving elements.

The portion of the power input and reduction linkage system described to this point primarily regulates the power output from each of the pumps in response to the position of the operator control levers, as will be more fully explained later. It can be appreciated that without the proportional power reduction means proposed by this invention, links 48 and 50 could be pivotally connected directly to the pump output control arms 64 and 66. In the disclosed preferred embodiment, rocker arms 60 and 62 pivotally interconnect links 48 and 50, respectively, to arms 64 and 66 for regulating power output and accommodating an interconnection between those arms and the overload sensing and proportionate reduction system.

The other portion of the linkage system proposed by the present invention includes input position links 76 and 78 pivotally connected to bellcrank arms 40 and 44, respectively, at connections 80 and 82. The input position links are respectively connected to guide links 84 and 86 by pivotal connections 88 and 90. The guide links are pivotally connected at one of their ends to respective rocker links 60 and 62 by pivotal connections 92 and 94 and have follower components 96 and 98 at their other ends which are slideably received along respective guide slots 102 and 104 of a rocker cam assembly (or sensing lever) 100.

As can best be seen in FIG. 2, rocker cam assembly 100 includes a central rocker element 106 which is pivotally mounted to the prime mover, as schematically illustrated, about the longitudinal axis of rocker shaft 108. Guide blocks 110 and 112 are mounted on opposed sides of the shaft and include the respective guide slots 102 and 104 which slideably receive the follower components of the guide links.

A hydraulic cylinder and piston 114 is pivotally connected to the central rocker element 106 for pivoting the rocker assembly, and thereby proportionally reducing the output of pumps 12 and 14 in accordance with the position of the follower components, as discussed in greater detail below. The hydraulic cylinder and piston is actuated by an overload sensing means 116 whenever the engine or one of the pumps experience an overload condition. The overload sensing device may comprise means operating in conjunction with the engine speed governor and responsive to fuel flow to the engine selected by the speed governor to give a signal of overloading when the fuel flow reaches a predetermined high level. Optionally, the overload sensing device may comprise a pressure sensing means measuring the pressure within each of the hydraulic pumps.

Since the overload sensing means can be of a conventional design its construction will be apparent to one skilled in the art.

A second preferred embodiment of the rocker cam assembly is illustrated in FIG. 3 and is indicated by reference numeral 200. In this embodiment the rocker cam assembly includes a generally rectangular frame 220 and opposed stub shafts 222 and 224 which are pivotally mounted to the prime mover, as illustrated schematically. In accordance with this embodiment, guide links 84 and 86 include universal joint connectors 230 and 232 which are slideably received along guide rods 226 and 228 rigidly attached to the rectangular frame. Rocker frame 220 is pivotally connected to the hydraulic actuator 114 by an ear 234 in the same manner as the connection illustrated in FIG. 1. Guide links 84 and 86 will position the universal joint connections 230 and 232, respectively, along guide rods 226 and 228 in accordance with the position of the operator control levers on the operator console. In both embodiments of the rocker cam assembly the follower components will be positioned at the assembly pivot axis along their respective guide elements when the operator control levers are in a neutral, or idling, position. When the operator control levers are moved to a position for forward power output, the follower components will move along their respective guide element away from the rocker cam assembly pivot axis a distance which is in direct proportion to the power output of each respective hydraulic pump.

OPERATION

As illustrated in FIG. 1, the operator control levers 36 and 38 are in a neutral or idling position, control lever 38 not appearing since it is identical to and in the same position as control lever 36. When it is desired to energize the output drive components 28 and 30 of the prime mover, the operator control levers are pivoted in a clockwise motion for forward drive or in a counter clockwise motion for reverse drive.

As illustrated in FIG. 4, the operator control levers 36 and 38 have been pivoted in a clockwise manner to different extents in order to drive the prime mover along a curved path. Movement of the operator control levers from the position illustrated in FIG. 1 to the positions in FIG. 4 rotates the respective bellcrank arms in a clockwise manner to the positions indicated. Specifically, movement of the operator control levers 36 and 38, and their respective bellcrank arms 40, 42 and 44, 46, to the positions illustrated in FIG. 4 simultaneously causes input control transmitting links 48 and 50 to move to the left and causes input links 76 and 78 to move downwardly. In response to this action, output rocker links 60 and 62 pivot essentially about respective points 92 and 94 and thereby cause pump output control arms 64 and 66 to pivot in a clockwise manner to energize pumps 14 and 12. The extent of the pivotal movements of output control arms 64 and 66 are illustrated respectively by the angles between lines N, A, and N'A ', the letters N and N' indicating the position of the output control arms when the operator control levers are in in a neutral position and the letters A and A' indicating the positions of the control arms with the operator control levers positioned as indicated in FIG. 4.

Also in response to the movement of the operator control levers 36 and 38 and of the input positioning links 76 and 78, the guide links 84 and 86 pivot essentially about respective connections 92 and 94 to move follower components 96 and 98 along respective guide slots 102 and 104 to the positions indicated.

If the operator control levers 36 and 38 are pivoted in a counter clockwise manner to energize output drive components 28 and 30 for reverse rotation, control arms 64 and 66 would be rotated in a counter clockwise direction and the follower components would be moved to a position above the rocker cam assembly pivot axis.

When the engine or one of the hydraulic swash-plate type pumps encounters an overload, the overload sensing means actuates hydraulic ram 114 so that the hydraulic ram piston rod is extended to rotate the rocker cam assembly about its pivot axis in a counter clockwise manner. If the power output from each of the hydraulic pumps is identical at the time of the overload, the follower components will be positioned away from the rocker cam assembly pivot axis an identical distance. Accordingly, when the rocker cam assembly is pivoted in response to an overload condition, the follower components are displaced along an arcuate path to reduce the power output from each of the pumps by the same amount.

With the follower components 96 and 98 located as illustrated in FIG. 4 due to the prime mover being in a curved steering course, the pivoting movement of the rocker cam assembly 100 in response to actuation of hydraulic ram 114 displaces the follower components from their vertically aligned positions by different amounts in direct proportion to their distance from the rocker cam assembly pivot axis, as illustrated in FIG. 5. In response to this pivoting action guide links 84 and 86 cause control arms 64 and 66, respectively, to pivot in a counter clockwise motion to proportionally reduce the power output from the hydraulic pumps 14 and 12. The counter clockwise angular displacement of the control arms 64 and 66 is indicated by lines A, B , B'. A', B'. Lines A and A' indicate the positions of the control arms illustrated in FIG. 4 before actuation of the hydraulic ram 114 in response to an overload condition. Lines B and B' indicate the new positions of the output control arms 64 and 66 after the output from the pumps has been reduced in response to the overload sensing means. The angles between the various lines have been exaggerated in FIG. 5 for purposes of illustration.

Because the power output from the hydraulic pumps 14 and 12 has been reduced a proportionate amount, the curved steering course of the prime mover is unaffected; only the speed of the output drive components 28 and 30 is reduced. Once the engine has overcome the overload condition, the piston rod of the hydraulic actuator 114 is retracted to reposition the operator control levers and control arms to their original positions indicated by lines A and A', thus restoring full power to the output drive components.

Although the discussion relating to the operation of the linkage system of the present invention has been directed to the operator control levers being manipulated to effect forward drive of the output drive components, the rocker cam assembly and interconnecting linkage elements are designed to effect proportionate power reduction to the hydraulic pumps when the operator control levers are positioned for reverse power output. Even if one of the hydraulic pumps is supplying power for forward drive and the other of the hydraulic pumps is supplying power for reverse drive, the power output will be proportionally reduced in an overload condition since the follower components will be displaced by the pivoting action of the rocker cam assembly in such a manner that the respective control arm will be pivoted towards its neutral idling position.

It is to be understood that the above description is merely exemplary and does not limit the invention to exclude various innovations and changes which will be apparent to those skilled in the art.

Having fully and completely described my invention, I claim:

1. In a prime mover, such as a crawler tractor, skid-steer tractor or the like, having a pair of independently operated variable power sources, said power sources having respective displaceable output control arms, wherein the improvement comprises:
   a pivotally mounted overload sensing lever having a pair of spaced, parallel guide surfaces extending radially of the pivot axis;
   a pair of follower components slideable along the respective lever guide surfaces;
   means interconnecting the following components with respective output control arms for displacing the follower components along the guide surfaces from the pivot axis a distance proportional to the power output from the power sources; and
   means for pivoting said lever in response to an overload condition and for proportionally reducing the power output from said power sources in accordance with the position of said follower components from said lever pivot axis.

2. The combination as defined in claim 1, wherein each of said guide surface extends radially of the pivot axis in opposed directions to accommodate movement of said follower components in response to power output for either forward or reverse drive.

3. In a prime mover, such as a crawler tractor including a pair of independently operated hydraulic power sources, wherein the improvement comprises:
   a pair of followers moveable in a reference plane in response to the power output of said respective power sources, said followers being positioned at a reference axis in the reference plane when said sources are idling;
   first means displacing said pair of followers in the reference plane from the reference axis distances proportional to the power output of the respective power sources;
   second means displacing said followers from the reference plane in response to an overload condition by distances directly proportional to the respective displacement distances of said followers from the reference axis; and
   third means reducing the power output from said hydraulic power sources an amount directly proportional to the displacement of each respective follower from the reference plane.

4. The combination as defined in claim 3, characterized by said second means including a pivotally mounted rocker cam having a pair of spaced, parallel guide surfaces slideably receiving respective followers.

5. In a prime mover, such as a crawler tractor, skid-steer tractor, or the like, having a pair of independently rotatable driving components energized by a pair of variable power sources, each of said power sources having an output regulator functionally interconnected to a separate operator control lever, wherein the improvement for proportionally reducing the output of both power sources during an overload condition comprises:
   a pivotally mounted cam having a pair of linear guide surfaces perpendicular to the cam pivot axis;
   a follower component slideably received along each respective cam guide surface;
   means interconnecting each of said respective follower components with one of said operator control levers, said interconnecting means positioning each of said follower components along its respective guide surface from the cam pivot axis by a distance that is directly proportioned to the output of each respective variable power source;
   means pivoting said cam when either of said power sources experience an overload condition, thereby arcuately displacing said follower components in direct proportion to their respective distances from the cam pivot axis; and
   means responsive to the displacement of each of said follower components for reducing the output of each respective power source in accordance with the arcuate displacement of said followers.

6. The combination as defined in claim 5, the further improvement of said cam being pivotally mounted about its longitudinal midpoint, said guide surfaces extending longitudinally along said cam such that the midpoints of said surfaces correspond with the cam pivot axis, said follower components being positionable on opposed sides of the pivot axis along the guide surfaces in response to forward or reverse rotation of said driving components.

7. The combination as defined in claim 5, characterized by said operator levers being pivotally mounted on said prime mover and including a bellcrank, the further improvement of said means interconnecting the operator levers and the followers including input positioned links pivotally mounted to one arm of said respective bellcranks, and said means interconnecting the output regulators and said operator levers including input control transmitting links pivotally mounted to the other arm of said respective bellcranks, such that operation of the operator levers simultaneously regulates the output of said power sources and positions the follower components along their respective guide surfaces in accordance with the power output.

8. The combination as defined in claim 7, the further improvement of said output regulators including an output control arm and an output rocker link pivotally mounted about its midpoint to said output control arm, said input control transmitting links being pivotally mounted to one of the ends of said respective output rocker links, and a guide link pivotally connected to the other end of each of said output rocker links, said guide links being connected at their distal ends to one of said respective followers and being pivotally connected to one of said respective input positioning links.

9. In a prime mover, such as a crawler tractor or the like, having a pair of independent rotary drive components energized respectively by a separate hydraulic power means, each of said power means having an output control regulated independently by a separate operator control lever, wherein the improvement for proportionally reducing the output from each hydraulic power means during an overload condition comprises:

a rocker cam pivotally connected to said prime mover and having a pair of linear guide surfaces extending radially of its pivot axis;

a first pair of linkage members respectively interconnected with said hydraulic power output controls, each of said first linkage members being slideable along one of said rocker cam guide surfaces;

a second pair of linkage members respectively interconnected between one of said first linkage members and one of said operator control levers for positioning said first linkage members along their respective cam guide surfaces from the rocker cam pivot axis by a distance that is directly proportional to the output of each respective hydraulic power means; and means for pivoting said rocker cam in response to an overload condition, pivotal movement of said rocker cam proportionally adjusting the position of each first linkage member to proportionally reduce the output from each hydraulic power means.

10. The combination defined in claim 9, characterized by said rocker cam being pivotally mounted centrally thereof, said pair of guide surfaces extending substantially the length of said rocker cam to accommodate movement of said first pair of linkage members in opposed directions away from said pivot axis in accordance with said hydraulic power means energizing said drive components for either forward or reverse rotation.

11. The combination defined in claim 9, characterized by each of said hydraulic power output controls including a pivotal control arm regulating the output of each power means and an output rocker link pivotally mounted centrally thereof on said pivotal control arm, said first linkage members being pivotally mounted to one end of each respective output rocker link, an input control transmitting link pivotally interconnected between each of said respective operator control levers and the other end of one of the output rocker links, such that upon pivoting said operator control levers the control arms of the hydraulic power means are pivoted by the pivotal interconnections of said output rocker links and input control transmitting links.

12. The combination defined in claim 11, characterized by each of said operator control levers including a bellcrank, the second linkage members being respectively connected to one arm of said bellcranks and the input control transmitting links being respectively connected to the other arm of said bellcranks.

13. The combination as defined in claim 12, characterized by said means for pivoting said rocker cam including a hydraulic ram interconnected between said prime mover and the rocker cam.

14. The combination defined in claim 13, further including a control means for sensing an overload condition in one of said hydraulic power means and actuating said hydraulic ram to pivot the rocker cam.

15. In a prime mover, such as a crawler tractor, skid-steer tractor, or the like, having an engine operatively interconnected with a pair of hydraulic pumps, each of said hydraulic pumps energizing a respective output shaft for a pair of independent drive components on the prime mover, output control means for each of said hydraulic pumps, dual operator control levers for respectively and independently regulating the output of each of said hydraulic pumps, wherein the improvement comprises:

a first pair of linkage means interconnecting each of said operator control levers with a respective hydraulic pump output control means for varying the output of said hydraulic pumps in response to the position of each respective operator control lever;

a control member pivotally connected to said prime mover and independently, slideably receiving each link of a second pair of linkage means, each of said second linkage means being interconnected with a respective operator control lever, said second pair of linkage means being positioned at the control member pivot axis when said operator control levers are in a neutral drive position and being independently positioned along said control member away from said pivot axis in direct relationship with the operative position of their respective control levers, each of said second linkage means being functionally interconnected with a respective hydraulic output control means;

means for pivoting said control member about its pivot axis when said engine experiences an overload condition and for proportionally reducing the output of each hydraulic pump through the functional interconnection between said second linkage means and said hydraulic output control means in accordance with the position of each second linkage means in relation to the cam pivot axis.

16. The combination defined in claim 15, characterized by said control member having a pair of linear guide surfaces slideably receiving each of said respective second links, said guide surfaces being perpendicular to the control member pivot axis.

17. The combination defined in claim 16, characterized by said control member being pivotally mounted about its longitudinal midpoint, said pair of linear guide surfaces extending in opposite directions away from said pivot axis to accommodate the second link members in response to said hydraulic pumps driving said output shafts in either a forward or reverse direction.

18. In a method of reducing the power output from a pair of hydraulic power means during an overload condition, said hydraulic power means driving the output members of a prime mover, such as a crawler tractor, the steps of:

1. displacing a pair of followers in a reference plane away from a neutral reference axis by a distance proportional to the power output of said respective power means;

2. displacing said followers from said reference plane in response to an overload condition by distances directly proportional to the respective displacement distances of said followers from the neutral reference axis; and 3. reducing the power output from said hydraulic power means by an amount directly proportional to the displacement of each respective follower during step (2).

19. The method as defined in claim 18, wherein the displacement of said followers in step (1) is in response to actuation of respective operator control levers.

20. The method defined in claim 18, further including the step of replacing said followers to their respective positions in the reference plane after the termination of an overload condition, thereby restoring the power output from each respective hydraulic power means.

* * * * *